United States Patent [19]
Bernard et al.

[11] 3,952,831
[45] Apr. 27, 1976

[54] COMPOSITE MATERIAL WITH ACOUSTIC ABSORPTION PROPERTIES

[75] Inventors: Jean-Paul Bernard, Dammarie-les-Lys; Pierre Jules Henry Brussieux, Alfortville; Louis Francois Jumelle, Ris-Orangis; Jean Lucien Simonin, Issy-les-Moulineaux, all of France

[73] Assignee: Societe Nationale d'Etude et de Construction de Moteurs d'Aviation, Paris, France

[22] Filed: Feb. 25, 1975

[21] Appl. No.: 552,744

[30] Foreign Application Priority Data
Feb. 26, 1974    France .............................. 74.06433

[52] U.S. Cl. ............................................ 181/33 G
[51] Int. Cl.² .......................................... E04B 1/74
[58] Field of Search ................. 181/33 G, 33 H, 42, 181/48

[56]     References Cited
         UNITED STATES PATENTS

| | | | |
|---|---|---|---|
| 1,754,784 | 4/1930 | Borsodi | 181/33 G |
| 2,039,601 | 5/1936 | London | 181/33 G |
| 3,237,714 | 3/1966 | Surine | 181/33 G |
| 3,353,626 | 11/1967 | Cremer et al. | 181/48 X |
| 3,734,234 | 5/1973 | Wirt | 181/33 G |
| 3,769,767 | 11/1973 | Scott | 181/33 G X |
| 3,831,710 | 8/1974 | Wirt | 181/33 G |

FOREIGN PATENTS OR APPLICATIONS
802,686    10/1958    United Kingdom .............. 181/33 G

*Primary Examiner*—Lawrence R. Franklin
*Attorney, Agent, or Firm*—William J. Daniel

[57]     ABSTRACT

A composite material with acoustic absorption properties of the "sandwich" type has a core of cellular structure between two skins substantially parallel one of which is cut-out by orifices while the other is devoid of orifices. The core is composed of a plurality of cells each of which extends from one skin to the other. A plurality of small plates, of material with high acoustic resistivity, are inserted into the cellular structure. Each plate has an active part contained in a plane substantially parallel to the skins, so that the active parts form, together, the equivalent of an intermediary wall of high acoustic resistivity dividing the cellular structure into two superposed layers each formed by a mass of sub-cells.

25 Claims, 36 Drawing Figures

COMPOSITE MATERIAL WITH ACOUSTIC ABSORPTION PROPERTIES

The present invention concerns a composite material with acoustic absorption properties of the sandwich type, which is composed of two substantially parallel skins, one of which is pierced by orifices while the other is devoid of orifices, and a core of cellular structure made up of a plurality of cells each of which extends, according to the thickness of the said cellular structure, from one skin to the other. The said cellular structure is, preferably, a honeycomb structure made of prismatic cells with hexagonal section, but it goes without saying that the invention is not limited to this form.

As is known, a composite material of the said type develops when it is in contact on its wall pierced by orifices with a vibrating gaseous medium, interesting acoustic absorption properties, due to the fact that it defines by its cells a series of elementary Helmholtz resonators arranged in parallel.

The syntonic frequency — i.e. the maximum absorption frequency — of each elementary resonator depends on its acoustic impedance which is a function of the dimensions of the cell being considered and those of the orifice (or orifices) across which this cell communicates with the vibrating gaseous medium.

The composite materials commonly used at the moment nevertheless have the disadvantage of only being truly effective in a rather narrow frequency band on either side of the said syntonic frequency. It would be extremely useful in numerous cases, for example for absorbing the acoustic emission of a by-pass engine, to have at one's disposal an absorbent material with wide band absorption.

In order to widen the absorption band of a composite material of the sandwich type it has already been thought of superposing between the two skins two cellular structures (for example two honeycomb structures) separated from each other by an intermediary wall made from a high acoustic resistivity material.

The "double" resonators thus established — the principle of which is known per se — have in effect an absorption band much wider than the "simple" resonators considered above, but they are rarely used in practice because they present serious difficulties of technological realisation.

In fact, the intermediary wall with high acoustic resistance mentioned above is necessarily of the porous type and is usually composed of a relatively flexible sheet of felting or fine netting, the mechanical strength characteristics of which are poor or even nil. Now it is necessary nevertheless that this intermediary wall should be able to withstand a minimum bending or shearing stresses because even if the two superposed cellular structures have the same pitch it is almost impossible, and in any case very difficult and very costly to make all the cells of one of the structures exactly coincide with the cells of the other structure.

Another disadvantage of the intermediary porous walls of known type is that they do not have a continuous area sufficiently large to ensure a good adhesion by brazing or cementing bond with the two cellular structures which said walls enclose it. The adhesion area of this wall could be increased by increasing the quantities of brazing or cementing material used but, in this case, of the brazing or cement owing to capillarity would obstruct a large number of pores in the wall, with the result of considerably decreasing the effective area of this wall, and thus of changing its acoustic resistivity.

The present invention aims to provide a composite material of the sandwich type composed, from the acoustic point of view, of a plurality of double resonators assembled parallel, and in which said flexible felting or netting is used in conditions such that the technological disadvantages to which it has just been alluded no longer appear.

According to the invention a composite material of the sandwich type comprises a core of cellular structure disposed between two substantially parallel skins one of which is pierced by orifices while the other is devoid of orifices, said core being composed of a plurality of cells each of which extends from one skin to the other, a plurality of small plates being inserted into the said cellular structure, each plate being made of a material with high acoustic resistivity and having an active part contained in a plane substantially parallel to the said skins, the said plane being common to the respective active parts of all the said small plates, so that the said active parts form, together, the acoustic equivalent of an intermediary wall with high acoustic resistivity dividing, in the direction of thickness, the said cellular structure into two superposed layers each formed by a series of subcells.

According to one embodiment, each of the said small plates is formed so that its active part, once it has been inserted inside the said cellular structure covers the surface of a single cell.

According to another embodiment, each of the said small plates is formed so that its active part, once the said small plate has been inserted inside the said cellular structure, covers the surface of at least two adjacent cells.

In all cases, as will be described in detail below, means are provided to retain, without brazing or cementing, each small plate in the preferred position between the two skins.

The description which will follow referring to the attached drawings, given by way of non restrictive example, will explain how the invention can be realised, the characteristics which result as well from the drawings as from the text being, of course, a part of the said invention. In these drawings:

FIG. 1 is a schematic transverse cross-section view of a composite material with acoustic absorption properties according to the invention, the said material comprising a core of cellular structure inside the cells of which is inserted a plurality of relatively flexible small plates made of material with high acoustic resistivity, FIG. 2 is a cross-section view along line II—II of FIG. 1, showing the said honeycomb structure, FIG. 10 is a developed plan view of a second configuration of small plate intended to cover the surface of a single cell of the said cellular structure, FIG. 11 is a sectional view similar to FIG. 9, showing the small plate according to FIG. 10 inserted and retained in position in its cell, FIG. 12 is a plan view from above following arrow XII of FIG. 11, showing the configuration taken by the said small plate after insertion in its cell, FIG. 13 is a developed plan view of a third small plate configuration intended to cover the surface of a single cell of the said cellular structure, FIG. 14 is a sectional view similar to FIG. 11, showing the small plate according to FIG. 13 inserted and retained in position in its cell, FIG. 15 is a plan view following the arrow XV of FIG. 14, showing the configuration taken by the said small plate after insertion into its cell, FIG. 16 is a perspective view similar to FIG. 3, illustrating a preliminary stage in the manufacture of a honeycomb structure inside which relatively flexible small plates may be inserted each covering the surface of two adjacent cells, FIG. 16a is a schematic view of a detail of FIG. 16, FIG. 17 is a phantom view in perspective view of a portion of cellular structure like a honeycomb effected from components shown in FIG. 16, FIG. 18 is a sectional view along XVIII—XVIII of FIG. 17, showing a first configuration of a small plate inserted into the said cellular structure and covering the surface of two adjacent cells, as well as a stabilisation tab of the said small plate, FIG. 19 is a plan view following the arrow XIX, of the small plate shown in FIG. 18, FIG. 23 is a pe rspective view of the small plate and of its positioning member according to FIGS. 20 to 22, inserted into the said cellular structure, FIG. 24 is a plan view illustrating a preliminary stage in the manufacture of the positioning member shown in FIGS. 20 to 23, FIG. 25 is a perspective view showing a second configuration of small plate inserted into the said cellular structure and covering the surface of two adjacent cells, FIG. 26 is a developed plan view of the small plate shown in FIG. 25, FIG. 27 is a perspective view showing a third configuration of small plate inserted into the said cellular structure and covering the surface of two adjacent cells, FIG. 28 is a sectional view along XXVIII—XXVIII, of the structure shown in FIG. 27, FIG. 29 is a developed plan view of the small plate shown in FIGS. 27 and 28.

In FIG. 1, a composite material with acoustic absorption properties of the sandwich type is shown comprising a core 3 of cellular structure of thickness of height H, situated between two substantially parallel skins 1 and 2 and to which it is fixed, for example, by brazing. This material can be used to line internally a duct (such as a by-pass engine duct forming part of a power-plant intended for equipping an aeroplane) containing a vibrating gaseous medium (air). In the following it will be supposed that the skin 1 is in direct contact with the vibrating gaseous medium.

The core 3 which usefully has a structure like a honeycomb visible in FIG. 2, is made up of a plurality of cells A each extending, according to the thickness or height H of the said structure, from one skin to the other. In the example shown, each of the cells is of prismatic configuration with hexagonal section.

The skin 1, which faces the vibrating gaseous medium, is pierced by a plurality of small orifices 4, in the proportion of, for example, two orifices to each cell A, while the other skin 2 is devoid of orifices.

According to the invention, a plurality of small plates 5 are inserted inside the cellular structure 3, each of these small plates having a part, referred to hereafter by the expression "active part", formed and arranged so as to divide at least one cell A of the said structure into two superposed sub-cells $A_1$, $A_2$ separated from one another by the said small plate and one of which is closed by the skin 1 while the other is closed by the skin 2. In FIG. 1, the active part of each of the small plates 5 is, in fact, the entire small plate.

Each of the small plates 5 is made of a material with high acoustic resitivity, which is therefore very porous and relatively flexible, such as felting or very fine netting. Means, which will be described below, allow retention of each of the said small plates in position in its cell, without brazing, cementing or any similar method which would be likely to diminish the acoustically effective surface of the said small plate.

As FIG. 1 shows, the respective active parts of small plates 5 are arranged substantially parallel to the two skins 1 and 2 at a suitable level $h$, for example at half the thickness (or half the height) between the said skins, and they are all situated, for example, in the same plane. Therefore, together they constitute the acoustic equivalent of an intermediary wall with high acoustic resistivity which divides the cellular structure 3, in the direction of thickness (or of height), into two superposed sub-structures $3_1$, $3_2$ one of which is made up by the assembly of sub-cells $A_1$ while the other is made up by the assembly of sub-cells $A_2$.

In this way, there is provided an absorbent material of the double resonator type, therefore having an enlarged absorption band, in which double resonators are formed, not by the superposition of two different cellular structures as in some known materials, but from a single cellular structure of thickness or height H. Therefore as, no stress is to be transmitted by the small plates 5, the difficulties of providing an intermediary wall with a high resistance to bending and shearing while being capable as well of a high acousticc resistivity, which were present in the known materials, no longer exist. Moreover, since the said small plates can be retained in position without the intervention of cement or brazing, these small plates substantially retain the whole of their acoustically effective surface and thus their acoustic resistivity.

The implementation of the invention will now be described in detatil, by considering, by way of example, the case of a cellular structure like a honeycomb, i.e. composed of prismatic cells with hexagonal section.

A classic method of manufacture of a cellular structure like a honeycomb will now be described with reference to FIGS. 2 to 4.

On a marble slab (not shown) is placed a first foil sheet $x$, on which some parallel stripes of cement $a$ have been traced with the assistance of paintbrushes of suitable width, a ccording to a pitch $p$ equal to 4 times the width $l$ of a stripe of cement. The width $l$ and therefore the pitch $p$ depend on the dimensions of the hexagons which one wants to obtain.

On this first foil sheet $x$ is put a second foil sheet $y$ on which the stripes of cement $a$ have been offset by half a pitch $p/2$ in relation to those of sheet $x$, and so on offsetting the stripes of cement $a$ each time by half a pitch on relation to those of the preceding sheet. In FIG. 3, some indication lines show the respective position of the different sheets when stacked.

Figure 4:
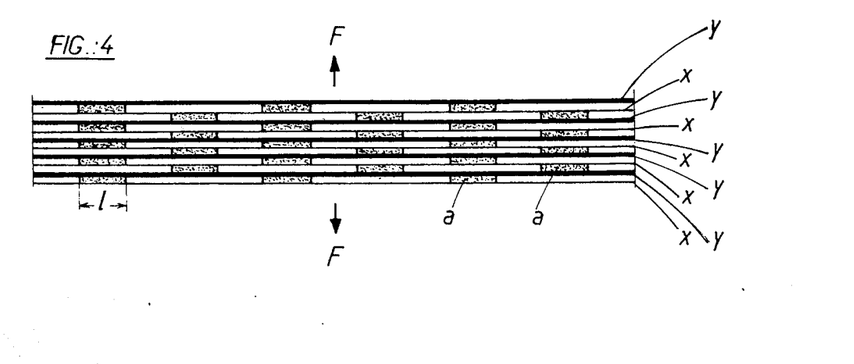
FIG. 4 is an end view illustrating another stage in the manufacture of the said cedllular structure.

When the cement has set (usually through polymerisation in an oven) the future honeycomb structure appears in the form of a solid "loaf"]with foliated structure as shown in FIG. 4 . In order to enable comprehension of the rest of the explanation, the foil sheets $x$ and $y$ have been shown by lines of a different thickness, but it goes without saying that these are usually of the same thickness. In addition, to clarify the drawing the thickness of the cement stripes has been very greatly exaggerated. In fact the successive sheets are in effect in contact over their entire surface.

Finally, the deisred honeycomb structure is obtained, purely and simply by drawing out the afore-mentioned loaf with foliated structure by its two opposite end sheets, as indicated by the arrows F in FIG. 4. The honeycomb structure is thus spread out into hexagonal cells in the same manner as some well known paper lanterns. FIG. 2 shows the honeycomb structure in spread out form. The successive foil sheets $x$, $y$ can be seen in this figure connected to one another by cement stripes $a$ of width $l$. There, too, the thickness of the cement stripes has been exaggerated greatly to assist comprehension of the drawing.

Figure 3:
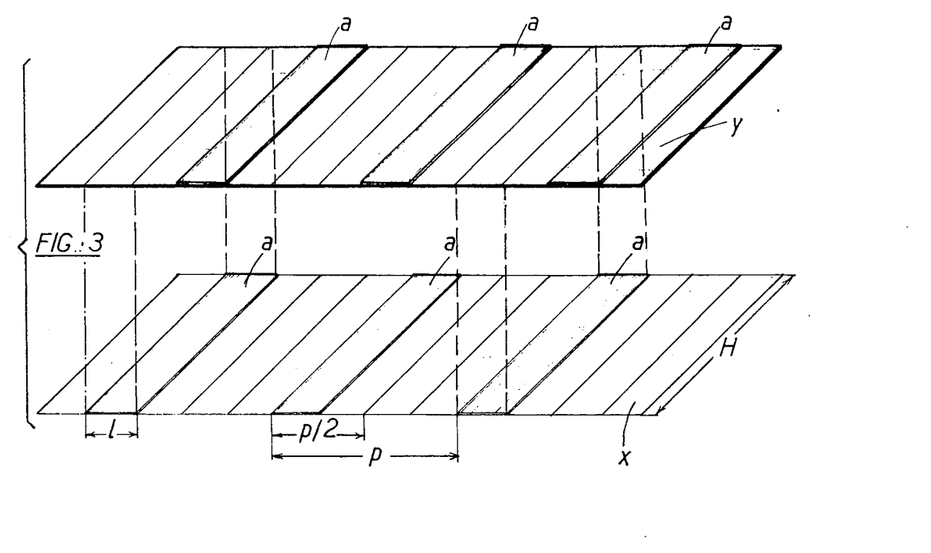
FIG. 3 is a perspective view illustrating a preliminary stage in the manufacture of the honeycomb structure shown in FIG. 2.

It has been supposed, in FIG. 3, that the foil sheets $x$ and $y$ had an initial height H equal to the thickness or height of the honeycomb structure to be obtained, but this is not essential and it is generally preferred to proceed by cutting up the solid loaf into slices of desired thickness or height.

Referring to FIGS. 5 to 9, in a first embodiment of the invention, each of the small plates 5 with high acoustic resistivity (felting or netting) is formed so that its active part, once it has been inserted inside the cellular structure 3, substantially covers the surface of a single cell.

Figure 5:
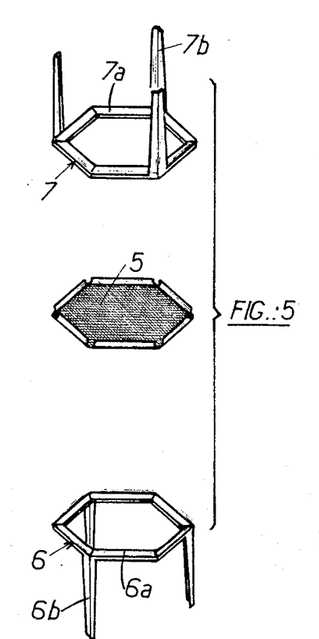
FIG. 5 is a schematic perspective view showing a first configuration of small plates covering the surface of a single cell of the said cellular structure and two positioning members intended to retain the said small plate in a fixed position inside the said cell.

In the example shown, each small plate 5 has the form of an hexagonal pellet the edges of which are, preferably, slightly raised or rolled up as indicated at 5a. Such small plates can be produced on a large scale in a suitable machine combining cutting the pellet with a punch and raising its edges, the raising being easily achieved because of the flexibility of the material (felting or fine netting) used.

The presence of rolled up edges 5a is advantageous for the following reasons.

Figure 8A:
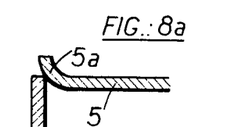
FIGS. 8a and 8b are two partial cross-section views along VIII—VIII of FIG. 7, illustrating two successive phases of the insertion of the said small plate into its cell.
Figure 8B:
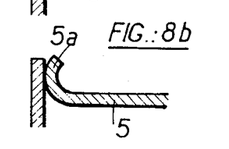

Firstly, it facilitates insertion of the small plates into their cells, even if the dimensions of these small plates are slightly larger than those of the cells (see FIGS. 8a and 8b). Use of such small plates, which are slightly oversize, is advantageous, moreover, because this allows one honeycomb structure manufactured economically without special and therefore expensive precautions to be sufficient to ensure perfect uniformity of size of all the cells.

Secondly, it prevents the sharp edges of the fibres of the felting or netting of the small plates from damaging the walls of the cells (which are made of very thin foil) during assembly or operation.

Thirdly, it allows friction assembly of the small plates in their cells, thereby ensuring adequate tightness fit at the periphery of the small plates. Thus marginal leaks modifying the acoustic resistivity of the small plates and therefore acoustic impedance of the double resonators are avoided.

Finally, it gives the small plates greater rigidity.

Bearing on each small plate 5 (see FIGS. 5 to 9) are two positioning members 6 and 7 situated one on each side of the small plate and each of which comprises one portion adapted to engage with the said small plate and another portion adapted to engage with one of the skins 1 or 2, so as to retain this small plate 5 at a level $h$, for example mid-way between the said two skins 1 and 2.

In the example shown, each of the two positioning members 6 and 7 have the shape of a stool, such as a tripod, the legs of which 6b, 7b are supported on the skin in question 1, 2. The platform 6a, 7a of this stool is heavily perforated in order not to substantially reduce the effective surface of the small plate 5 and this is confined, in practice, to a narrow border just sufficient to act as abutment to the marginal portion of the said small plate. In the case where the latter has a rolled up edge 5a the table of the "upper" stool 7 is slightly smaller than that of the "lower" stool 6, so as not to rest on the rolled up edge 5a but to be slightly recessed therefrom. The stools 6 and 7 are advantageously made of foil and they are designed to be a mild interference fit in the cells.

Having taken into consideration the number of cells whicih make up the cellular structure, the number of members, i.e. the small plates and positioning members, inserted into the said structure is extremely high, in the region of several tens of thousands, or even several hundreds of thousands for each propellent unit of an aero engine to be fitted with sound-absorbing material, according to the dimensions of the acoustic component to be impelemented. Therefore the material in accordance with the invention is produced on a very large scale so that the unit-price falls to an extremely low value because of the means employed which are justified by the very high number of identical members to be made (several millions and even several tens of millions for a normal production run of aero engines).

Figure 6:
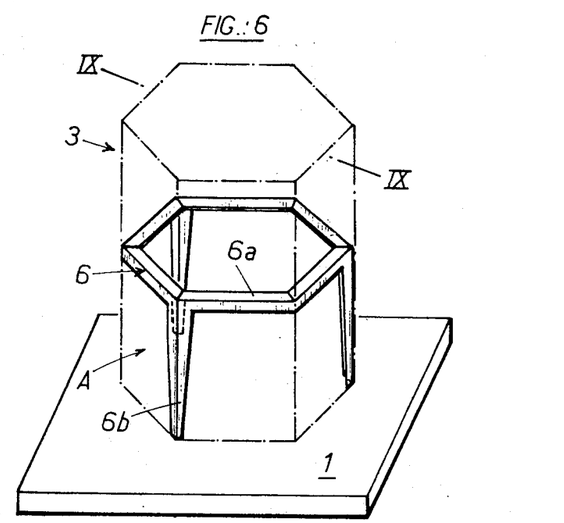
FIG. 6 is a perspective view on a larger scale, showing a positioning member according to FIG. 5, inserted inside a cell.
Figure 7:
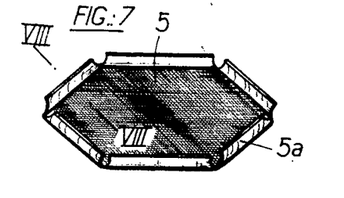
FIG. 7 is a perspective view completing FIG. 6 and showing the small plate ready to be inserted into the cell.

Insertion of the small plates 5 is effected in the following way:

The cellular structure 3, after having been assembled, for example according to the method described with reference to FIGS. 2 to 4, is fixed by a method known per se (using an adhesive, brazing or welding, for example) to one of the skins, preferably the perforated skin 1 which is intended to come into contact with the vibrating gaseous medium. In each of the cells A of the cellular structure 3, a lower stool 6 is placed the legs of which 6b are supported against this skin, as shown in FIG. 6.

Then each of the small plates 5 is inserted, in the way shown in FIGS. 8a and 8b, until one of its faces abuts against the perforated table 6a of a stool 6. Finally an upper stool 7 is placed into each cell so that the perforated table of which 7a abuts against the other face of the small plate 5 under consideration. It only remains to fix to the cellular structure 3, for example with an adhesive, by cementing, brazing or by welding, the second skin 2 which abuts the legs 7b of the stool 7. The successive operations of positioning of the lower stools 6, of the small plates 5, and the upper stools 7 can be effected either by hand or using automatic machines.

Figure 9:
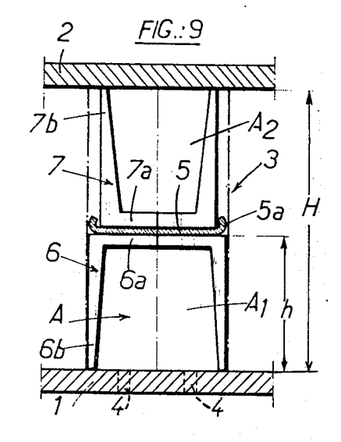
FIG. 9 is a cross section view along IX—IX of FIG. 6, illustrating the small plate inserted into its cell and retained between its two positioning members.

FIG. 9 shows the final result of the operations which have just been described: each small plate 5, inserted at the desired level $h$ into a cell A of the cellular structure 3, divides the said cell into two superposed sub-ccells $A_1$ and $A_2$, so as to define a double resonator.

It can be easily seen that the small plate 5 in no way modifies the cohesion of the composite cellular material 1-2-3, that it does not receive any stress from this material and that it does not transmit any thereto, and that its effective surface is not diminished (from the acoustic point of view) by absorption of cement or of brazing. The small plate 5 only has to be sufficiently rigid not to sag excessively under the action of the very weak forces which are applied to it in service, namely its appropriate weight, the forces of inertia (during acceleration, deceleration or a change in direction of the aeroplane), and the forces dues to the difference in pressure caused by the passage of air in one direction then in the other, at the time of acoustic operation. In view of the small size of the plate 5 and the possible existence of the rolled up edge 5a, this degree of rigidity is easily achieved.

FIGS. 10 to 12 illustrate a variation of the preceding embodiment, according to which a small plate 105 with high acoustic resistivity includes an active part 105a substantially parallel to the two skins 1 and 2, and a portion 105b folded as an "$\Omega$", arranged as a projection in a relation to the said active part 105a and pointing towards the skin 2 so as to be supported on the said skin.

Retention of this small plate in position is thus ensured, on the one hand by a perforated lower stool 6 (similar to the stools 6 shown in FIG. 9), and on the other hand by the part 105b of the said small plate folded as $\Omega$. Assembly thus only comprises two successive operations to each cell (instead of three), namely: positioning of the lower stool 6, and insertion of the follded small plate 105 with the top of its $\Omega$ forming an upper stop. FIG. 10 is a plan view of the small plate 105, before it has been folded.

FIGS. 13 to 15 illustrate another variation of the preceding embodiment according to which a small plate 205 with high acoustic resistivity comprises an active part 205a substantially parallel to the two skins 1 and 2, and three folded parts 205b, 205c, 205d arranged as projections in relation to the said active part. The part 205b is folded as an $\Omega$ and points towards the skin 1, so as to be supported against the said skin 1. The parts 205c, 205d are folded substantially at right angles and point towards the skin 2, so as to be supported against the said layer 2.

Retention of this small plate 205 in position is thus ensured, on the one hand by the folded part 205b, and on the other hand by the folded parts 205c and 205d. The assembly thus only comprises a single operation for each cell, namely insertion of the previously folded small plate, so that its folded part 205b forms a lower stop and its parts 205c and 205d form an upper stop. FIG. 13 is a plan view of the small plate 205, before it has been folded.

It will be observed, concerning the two variations which have just been described respectively referring to FIGS. 11 and 14, that in each cell A, one of the sub-cells ($A_2$ in the case of FIG. 11, $A_1$ in the case of FIG. 14) is split into two by the porous "vertical" wall 105b (FIG. 11) or 205b (FIG. 14). Consequently, there is a risk that the acoustic properties of the resonator formed by the sub-cell under consideration will be modified. If necessary the presence of this "vertical" wall can be compensated for by choosing a cellular structure with cells of larger section, and by perhaps modifying the respective heights of the two sub-cells.

FIGS. 16 to 24 relate to a second embodiment of the invention, according to which, each of the small plates is formed so that, once it has been inserted into the cellular structure 3, its active part covers the surface of two adjacent cells such as A' and A'' (see FIG. 2).

Reference will be made first of all to FIGS. 17 and 18 which show two adjacent cells A' and A'' separated from one another by a common wall 10 which forms part, for example, of a foil sheet $y$ (see FIG. 2).

The common wall 10 has two opposite edges, namely an edge $10_1$ which is supported directly against the skin 1, and an edge $10_2$ facing the skin 2. The height $h$ contained between the two edges of this wall is lower than the height or thickness H of the cellular structure 3.

The edge $10_2$ of the common wall 10 acts as a stop on which is supported, as well as a balance fulcrum, a "double" small plate 305 with high acoustic resistivity which extends on both sides of the said joint wall and which, in the example shown in FIG. 19, takes the form of a double hexagon, with a common side.

As shown in FIG. 18, the small plate 305 divides each of the two adjacent cells A' and A'' into two superposed sub-cells $A'_1$-$A'_2$ and $A''_1$-$A''_2$, the sub-cells $A'_2$ and $A''_2$ communicating with one another.

FIG. 16 (which is similar to FIG. 3) shows a stage in the manufacture, according to the general principle already explained with reference to FIGS. 2 to 4, of a honeycomb structure having cut away portions as indicated in FIGS. 17 and 18. For this purpose, alternate foil sheets (in the example shown, each of the sheets $y$) of the future cellular structure has cut-outs parts or windows spaced according to the same pitch $p$ as the stripes of cement $a$, but displaced by a distance $p/4$ in relation to the latter. The width of these cut-outs parts is equal to the width $l$ of the stripes of cement, and their depth is such that the future separating walls 10 remain intact at a height $h$. Naturally it will be necessary to mark precisely (for example, by means of centering) the foil sheets $x$ in relation to the foil sheets $y$, at the time of stacking them.

The foil sheets $x$ and $y$ have been shown in FIG. 16 with a height H equal to the thickness or height of the cellular structure to be achieved. But it is obvious as has already been explained above that it is also possible to work from sheets the height of which would be a multiple of the height H and in which would be pierced, not one, but several lines of "windows" of appropriate height, the cutting up of the solid loaf being carried out to the desired proportion before unfolding.

After unfolding, the cellular structure is formed as indicated in FIGS. 17 and 18, with separating walls 10 cut away by a fraction (H-$h$) of their height. Obviously this causes a slight weakening of the general resistance of the composite material 1-2-3 to shear stresses.

This weakening nevertheless remains very small because the cut-outs parts only concern, in total, an eighth of the extended total length of the cellular structure (in other words, the foil sheets continue to be supported by the ⅞ of their total extended length, against the skin 2). Moreover, because the skin 2 is rigidly connected to the cellular structure (for example by brazing or cementing), the fraction of shear stress which would not be transmitted by the cut away parts of the cellular structure is taken up in shearing stress by the said skin. In that case it would be sufficient therefore to increase very slightly (for example by a few hundredths of a millimetre) the thickness of this skin in order to compensate for the reduction in resistance resulting from the said cut-out.

The small plate 305, which rests with its central part of the edge $10_2$ of the cut-out wall 10, has to be fixed in position. Several alternative means, some of which can be used in combination, can be used for this purpose.

A first stabilising means comprises one or several tabs 11 projecting into the cells A' and/or A'', substantially opposite the cut-out wall 10, and each of which has an edge $11_2$ situated at the same level as the edge $10_2$ of the said cut away wall. The small plate 305 can thus be supported by one or more areas remote from its central part, on the edge $11_2$ of the tab or tabs mentioned and cannot therefore rotate about the edge $10_2$ of the cut-out wall 10.

Each tab 11 has for example a triangular shape which can be obtained (see FIGS. 16 and 17) by cutting out from a foil sheet $x$ or $y$, the two sides ST and RT (see FIG. 16) a triangular portion RST the uncut side RS of which coincides with an intended folding line or ridge $\alpha$ of this sheet. Cutting-out is effected in an area of the foil sheet which, when the cellular structure 3 is spread out, will turn about the said folding line by 60° to form one of the four "simple" (that is to say not cemented) faces (for example, the face Δ, FIG. 17) of a cell A' or A''.

At the moment of spreading out the cellular structure, the face in question will turn as a whole around its folding line or ridge $\alpha$, except for the triangular portion RST which will remain practically parallel to the two double faces (that is to say cemented faces) of the said cell (see FIG. 17).

Moreover it will be advantageous, to avoid all residual friction of the sides ST and RT to the remainder of the face Δ, if there is a gap $11x$ along the said sides, as shown in FIG. 16$a$. To this effect, the cut-out of the sides could, for example, be done by using a punch.

FIG. 17 relates to the case where the support tabs 11 have been obtained by cutting the foil sheets $x$. FIGS. 2 and 16 show, in their lower part, the distribution in this case of such tabs.

The tabs can also be cut in the foil sheets $y$ only, which in any case must already by cut to provide the main support edges $10_2$. In fact it is generally more economic to use a single machine which, in a single operation, carries out the two operations mentioned on one foil sheet, rather than to treat two series of sheets with two different machines. FIGS. 2 and 16 show, in their upper part, the distribution in this case of such tabs marked 111.

For the same reasons as those already shown previously, the reduction in strength of the composite material 1-2-3, which results from the formation of the tabs 11 or 111 is very low and can be compensated by a very slight increase in the thickness of the skins 1 and 2.

A second stabilising means for the small plate 305 resting on the support edge $10_2$ is shown in FIGS. 20 to 24 in the form of a positioning member 12 in function of which is similar to that of the stool 7 shown in FIGS. 5 to 9. The positioning member 12 has two parts 12$a$ and 12$b$ supported on the small plate 305 and on the skin 2 respectively.

Figure 20:
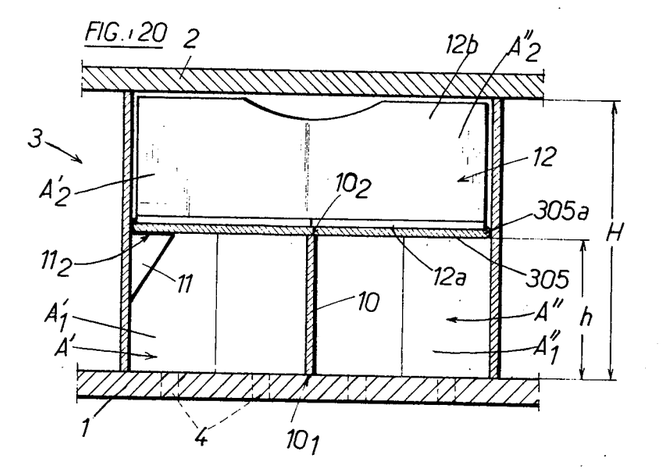
FIG. 20 is a sectional view similar to FIG. 18, further showing a positioning member cooperating with the said small plate.
Figure 21:
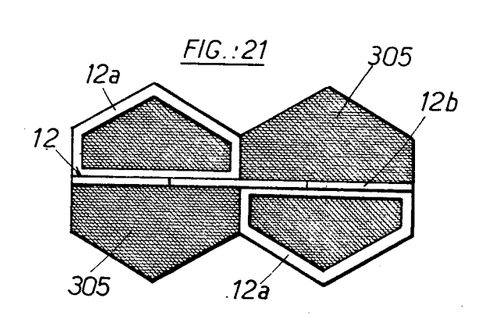
FIGS. 21 and 22 are plan and perspective views respectively, of the small plate and the positioning member shown in FIG. 20.

The part 12$a$ which is supported on the small plate is heavily cut-out in order not to reduce the effective surface (from the acoustic point of view) of this small plate needlessly and it is in effect limited to a narrow border.

Figure 22:
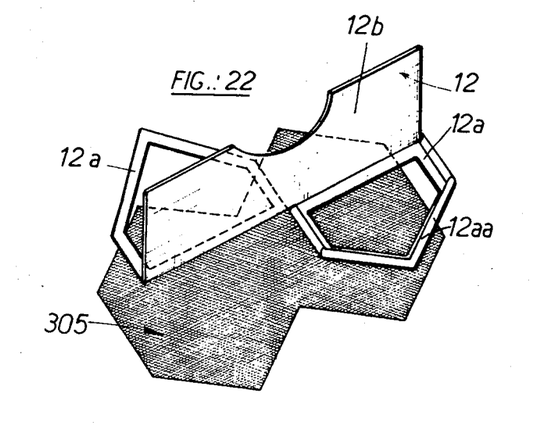

The positioning member 12 can be formed, for example, from a foil sheet cut as shown in FIG. 24, then folded as shown in FIG. 22. The edges of the part 12$a$ can be lifted or rolled up as shown at 12$aa$ (see FIG. 22) to avoid damaging the side walls of the cells A' and A'' when introducing the said member. According to one embodiment, the part 12$a$ of the positioning member 12 could be formed from a plain metal wire folded into an S.

The positioning of the double small plates 305 is carried out in the following way. The cellular structure 3, after having been made for example according to the process explained referring to FIGS. 2 to 4 and 16, is fixed, for example by brazing or cementing, to one of the skins, preferably the perforated skin 1. In each group of two adjacent cells A'-A'', a double small plate 305 which is placed, on one of its faces, on to the edge $10_2$ of the separating wall 10 between the two cells, and on to the edge $11_2$ of the tabs 11 (in the optional case where such tabs are used). Then in each group of two cells A'-A'', a positioning member 12 is placed the cut-out face 12$a$ of which abuts against the other face of the small plate 305 under consideration. It then only remains to fix to the cell 3, for example by welding or brazing, the second skin 2 which abuts the part 12$b$ of the positioning member 12.

Keeping the small plate 305 in position and stabilising it is thus ensured, on the one hand, by the edge $10_2$ of the wall 10 (and, possibly also by the tabs 11), and on the other hand, by the positioning member 12.

FIG. 20 shows the final result of operations which have just been described: each double small plate 305, inserted at the desired level $h$ in a group of two adjacent cells A' and A'', divides each of the said cells into two superposed sub-cells $A'_1$-$A'_2$ and $A''_1$-$A''_2$, so as to define two double resonators. It will be seen that the adjacent sub-cells $A'_2$ and $A''_2$ communicate with one another.

It is clear that this small plate does not receive any stress from the composite material 1-2-3 and that it does not transmit any thereto, and that its effective surface (from the acoustic point of view) is not reduced by joining with cement or with brazing. As in the case of the single small plates, this double small plate will only have to be sufficiently rigid not to be excessively deformed by bending under the action of the forces which are applied to it in service (particularly the pressure loads during acoustic operation). To this effect, the use of lifted or rolled up edges 305a (similar to the rolled up edges 5a of the single small plates 5) could (among other advantages) contribute efficaciously to increasing the rigidity of the small plate. Nevertheless, especially in the absence of support tabs 11 the surface of cells A' and A'' should not be excessive in order to avoid sagging of the plate on either side of the central support $10_2$.

FIGS. 25 and 26 illustrate a variation of the previous embodiment, according to which a double small plate 405 with high acoustic resistivity comprises an active part 405a substantially parallel to the two skins 1 and 2, and a part 405b folded an an $\Omega$, projecting in relation to the said active part and directed towards the skin 2 so as to be supported on the said skin. The folded part 405b extends transverse to the plane of the joint wall 10 which separates the two adjacent cells A' and A'' (see FIG. 20).

Keeping this small plate in position and stabilising it is thus ensured, on the one hand, by the edge $10_2$ of the wall 10, and on the other hand, by the part 405b of the said small plate folded as a $\Omega$. FIG. 26 is a plan view of the small plate 405 before it was folded.

It will be seen, referring to the two variations which have just been described respectively in relation to FIGS. 23 and 25, that in each cell A' or A'', the upper sub-cell A'$_2$ or A''$_2$ is divided into two by the vertical wall 12b (FIG. 23) or 405b (FIG. 25). The possible inconvenience which could occur on the acoustic level can be compensated in the way already indicated above with respect to FIGS. 11 and 14.

FIGS. 27 to 29 illustrate another variation of the embodiment with double small plates, according to which the common wall 10 which separates two adjacent cells A' and A'' is only cut out to a very slender height (substantially equal, for example, to the thickness of the double small plate to be inserted), so that the edge $10_2$ of this wall is situated in the immediate proximity of the skin 2.

In each group of two adjacent cells A' and A'', a double small plate 505 with high acoustic resistivity is inserted, comprising an active part 505a substantially parallel to the two skins 1 and 2, and a part 505b folded as an $\Omega$, projecting from the said active part 505i a and directed towards the skin 2. But in this case, the folded part 505b is situated substantially on a plane with the joint wall 10 mentioned earlier which it is astride on a level with the edge $10_2$ of this wall. After assembly, the skin 2 is supported and is fixed against the top of the folded part 505b of the small plate 505. A slight sinking, at this level of the small plate, occurs which is favourable to the rigidity of the whole assembly.

Rotation of the small plate 505 is prevented in one direction by the shape of the said small plate (since the separating wall 10 is enclosed between two parallel faces of this small plate), and, in the other direction by its confinement between the edge $10_2$ of the wall 10 and the skin 2. FIG. 29 is a plan view of the small plate 505 before folding.

Figure 30:
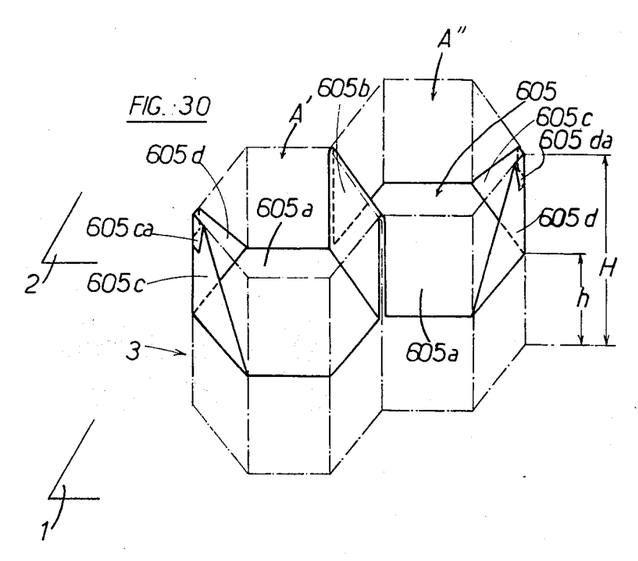
FIG. 30 is a perspective view showing one way of constructing the small plate shown in FIG. 27.
Figure 31:
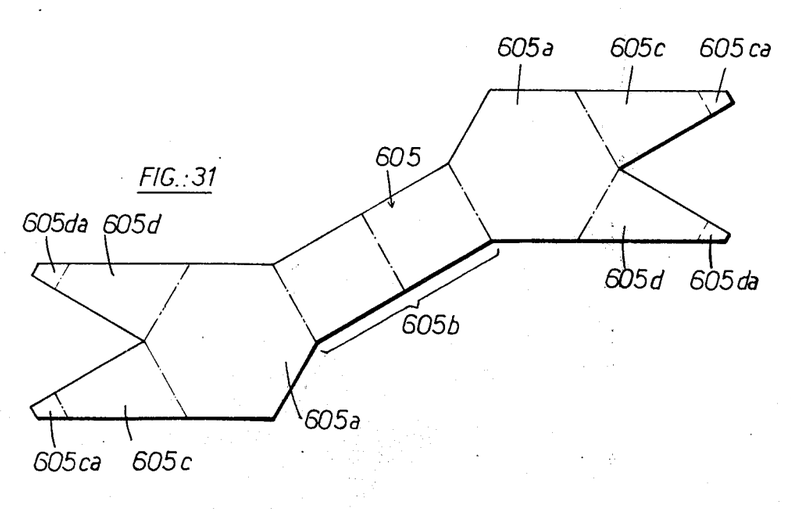
FIG. 31 is a developed plan view of the small plate shown in FIG. 30.

FIGS. 30 and 31 illustrate a variation of the arrangements shown in FIGS. 27 to 29, according to which each double small plate (shown here by the reference 605) comprises, besides a folded part 605b similar to the folded part 505b shown in FIG. 27, other folded parts 605c and 605d each of which may itself have a folded end 605ca or 605da capable of hooking on to the upper edge of a face of a cell A' or A''. Keeping the small plate in position is thus ensured in an even more effective way. FIG. 31 is a plan view of the small plate 605 before folding.

Figures 32, 33:
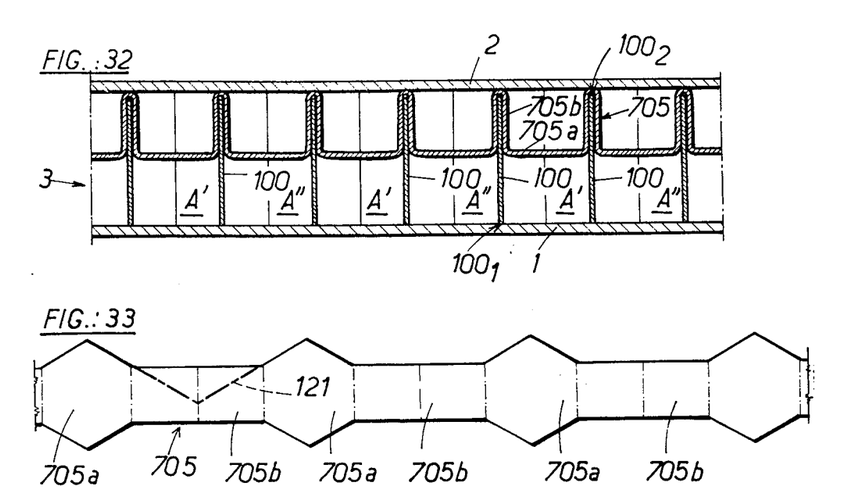
FIG. 32 is a sectional view simlar to FIG. 28, but on a smaller scale, showing a small plate covering the area of a plurality of cells arranged in line.
FIG. 33 is a developed plan view of the small plate shown in FIG. 32.

FIGS. 32 and 33 illustrate another embodiment of the invention, which constitutes, moreover, a generalisation of the embodiment shown in FIGS. 27 to 29.

In FIG. 32, there is shown, forming part of the cellular structure 3, a plurality of cells A'-A''-A'-A''-A' . . . arranged in line and adjacent in pairs, two successive cells A'-A'' being separated from one another by a common wall 100 which has two opposite edges $100_1$ and $100_2$, one of which (the edge $100_1$) is supported directly on skin 1, while the other (the edge $100_2$) is free, that is to say without direct contact with the skin 2.

To each line of cells, such as that just considered, a small plate 705 with high acoustic resistivity is associated, formed by a band containing an active part 705a substantially parallel to the two skin 1 and 2, and a plurality of parts 705b projecting in relation to the said active part and folded as an $\Omega$ so as to be astride each of the said joint walls 100 successively on a level with its free edge $100_2$.

The distance between the said free edge $100_2$ and the skin 2 is preferably chosen to be very slight (substantially equal, for example, to the thickness of the small plate 705) so that after assembly the skin 2 is supported and is fixed (for example, by brazing) against the respective tops of the folded parts 705b of the small plate 705.

FIG. 33 is a developed plan view of a stripe of small plates 705. Using such stripe of small plates is understood to permit quicker industrial production of the composite material in accordance with the invention.

The separating walls 100 which have just been considered are preferably the double walls of the honeycomb structure 3. These double walls — two walls cemented together belonging respectively to a sheet x and a sheet y — are, in fact, more rigid than the separating single walls such as the walls 10.

Figure 34:
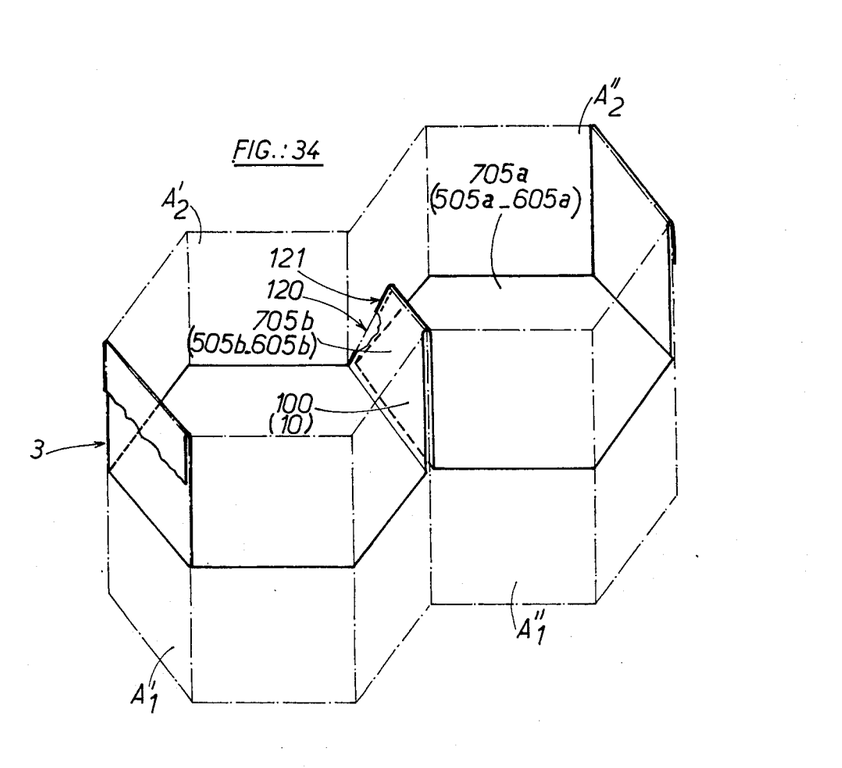
FIG. 34 is a perspective view showing a manufacture variation of the structures shown in FIGS. 27, 31 and 32.

FIG. 34 shows a variation of the structures shown in FIGS. 27, 31 and 32, applicable to the case where one wishes, for acoustic reasons, two adjacent sub-cells A'$_2$ and A''$_2$ to communicate with one another in pairs.

To this effect, the separating wall 10 (or 100) between these two sub-cells which are adjacent has a notch 120, and the folded part 505b (605b–705b) of the small plate 505 (605–705) which is astride the said separating wall has a corresponding notch 121 the position of which has been shown by broken lines in FIG. 33.

It will be seen, in certain variations of the embodiments which have just been described, that the lifted or rolled up edges of some small plates have not been mentioned or shown — to ensure simplification or clarity of the drawing. But it is obvious that such edges can be used in all cases.

It is clear that the embodiments described are only examples and that it will be possible to modify them, especially by substitution of technical equivalents, without departing from the framework of the invention.

We claim:

1. A composite material with acoustic absorption properties of the sandwich type comprising, two substantially parallel skins one of which is cut-out by orifices while the other is devoid of orifices, a core of cellular structure disposed between said two skins and composed of a plurality of cells each of which extends from one skin to the other, a plurality of small plates inserted into said cellular structure made of material with high acoustic resistivity, and an active part for each of said cells contained in a plane substantially parallel to the said skins, the said plane being common to the respective active parts of all the said small plates, so that the said active parts form, together, the acoustic equivalent of an intermediary wall with high acoustic resistivity dividing, in the direction of thickness, the said cellular structure into two superposed layers each formed by a mass of sub-cells.

2. A material according to claim 1, wherein each of the said small plates is formed so that, after insertion into the cellular structure, its active part covers the surface of a single cell.

3. A material according to claim 2, including means for holding the said small plate in a fixed position between the said two skins.

4. A material according to claim 3, wherein the said means for holding the small plate include at least one positioning member having a part abutting the said small plate and another part abutting one of the said skins.

5. A material according to claim 4, wherein the said holding means comprise two positioning members one of which is situated on one side of the said small plate and supported on one of the said skins while the other is situated on the other side of the said small plate and supported on the other skin.

6. A material according to claim 4, wherein each of the said positioning members takes the form of a stool, the platform of which is cut-out and the legs of which are supported on the appropriate skin.

7. A material according to claim 3, wherein the said means for holding the small plate comprise at least one folded part of the small plate projecting from the active part thereof towards at least one of the said skins, so as to be supported on the skin.

8. A material according to claim 1, wherein each of the said small plates is formed so that, after insertion into the cellular structure, its active part covers the surface of at least two adjacent cells.

9. A material according to claim 8, wherein two adjacent cells are separated from one another by a common wall having two opposite edges one of which is supported directly on one of the said skins, the said small plate extending on both sides of the other edge of the said common wall while being supported thereon.

10. A material according to claim 9, wherein the said joint wall is cut-out so that the distance between the two opposite edges thereof is less than the thickness of the cellular structure.

11. A material according to claim 9, including means for stabilising the said small plate in position on said edge of said common wall.

12. A material according to claim 11, wherein said means for stabilising the small plate comprise a positioning member having a cut-out part which is supported on the said small plate and another part which is supported on the other of the said skins.

13. A material according to claim 11, wherein said means for stabilising the small plate comprise, at least one folded part of the small plate projecting from the active part thereof towards the other of the said skins so as to be supported on the skin.

14. A material according to claim 13, wherein the said folded part of the small plate extends transversally of the plane of the common wall separating said two adjacent cells from one another.

15. A material according to claim 13, wherein the said folded part of the small plate is situated substantially in the plane of the common wall which separates said two adjacent cells from one another.

16. A material according to claim 15, wherein the small plate has at least two folded parts.

17. A material according to claim 11, wherein said means for stabilising the small plate comprise at least one tab cut from at least one wall, other than the said common wall, of at least one of said two adjacent cells on the same level as said support edge, and on which the said small plate is supported.

18. A material according to claim 1, wherein each of the said small plates is formed so that, after insertion into the cellular structure, its active part covers the surface of a plurality of cells arranged in line and adjacent in pairs.

19. A material according to claim 18, in which two adjacent cells forming part of the said line are separated from one another by a common wall which has two opposite edges one of which is supported directly on one of the said skins and the other of which is free, said small plate comprising a plurality of folded parts arranged so as to straddle said common walls successively, on a level with the said free edge.

20. A material according to claim 19, wherein the said common wall, on the one hand, and at least some of said folded parts of the small plate, on the other hand, are notched so as to allow communication between two adjacent sub-cells.

21. A material according to claim 1, wherein each of the said small plates has at least one rolled up edge.

22. A material according to claim 1, wherein the material of high acoustic resistivity of which said small plates are made is porous.

23. A material according to claim 22, wherein said porous material is felting.

24. A material according to claim 22, wherein said porous material is netting.

25. A material according to claim 1, wherein said cellular structure is a honeycomb structure composed of prismatic cells of hexagonal cross-section.

* * * * *